(12) United States Patent
Tweel et al.

(10) Patent No.: US 12,088,603 B2
(45) Date of Patent: Sep. 10, 2024

(54) MULTI-COMPUTER SYSTEM FOR COMPREHENSIVE THREAT DETECTION AND MITIGATION

(71) Applicant: Bank of America Corporation, Charlotte, NC (US)

(72) Inventors: Benjamin F. Tweel, Romeoville, IL (US); Neal Aaron Slensker, Fort Mill, SC (US); James Siekman, Charlotte, NC (US); Shannon Sabina Rolinger, Pineville, NC (US); John Raymond Omernik, Wittenberg, WI (US); Rebecca Lynn Pietro, Indian Land, SC (US)

(73) Assignee: Bank of America Corporation, Charlotte, NC (US)

( * ) Notice: Subject to any disclaimer, the term of this patent is extended or adjusted under 35 U.S.C. 154(b) by 228 days.

(21) Appl. No.: 17/739,531

(22) Filed: May 9, 2022

(65) Prior Publication Data
US 2023/0362174 A1 Nov. 9, 2023

(51) Int. Cl.
*H04L 9/40* (2022.01)

(52) U.S. Cl.
CPC ...... *H04L 63/1416* (2013.01); *H04L 63/1425* (2013.01); *H04L 63/1441* (2013.01)

(58) Field of Classification Search
CPC ............. H04L 63/1416; H04L 63/1425; H04L 63/1441; H04L 63/1433; H04L 63/145; H04L 63/1458; H04L 63/1466; H04L 63/1475; H04L 63/1483; H04L 63/1491
See application file for complete search history.

(56) References Cited

U.S. PATENT DOCUMENTS

| 7,926,113 | B1* | 4/2011 | Gula ................... H04L 63/1425 726/25 |
| 9,749,343 | B2 | 8/2017 | Watters et al. |
| 9,749,344 | B2 | 8/2017 | Watters et al. |
| 10,095,866 | B2 | 10/2018 | Gong et al. |
| 10,230,761 | B1 | 3/2019 | Joffe |
| 10,609,079 | B2 | 3/2020 | Crabtree et al. |
| 10,826,928 | B2 | 11/2020 | Carey et al. |
| 2008/0082380 | A1* | 4/2008 | Stephenson ............ G06F 21/55 726/25 |
| 2013/0340082 | A1* | 12/2013 | Shanley ................ G06F 21/577 726/25 |
| 2017/0063907 | A1* | 3/2017 | Muddu ................. G06N 20/00 |
| 2018/0124072 | A1* | 5/2018 | Hamdi .................. G06F 21/577 |
| 2018/0124094 | A1* | 5/2018 | Hamdi ..................... G06F 7/24 |
| 2019/0132273 | A1* | 5/2019 | Ryan ................... H04L 63/1483 |

(Continued)

*Primary Examiner* — Kostas J Katsikis
(74) *Attorney, Agent, or Firm* — Banner & Witcoff, Ltd.

(57) ABSTRACT

Arrangements for comprehensive threat mitigation are provided. In some aspects, an indication of threat or potential threat may be received from an external entity. In some examples, the threat may include a cybersecurity threat. In response to receiving the indication of threat, identifying data associated with the external entity may be extracted from the indication and used to retrieve pre-stored customizations associated with the desired mitigating actions of the external entity. The one or more mitigating actions may be identified and instructions to execute the one or more mitigating actions may be generated and transmitted to one or more computing devices for execution.

21 Claims, 13 Drawing Sheets

(56) References Cited

U.S. PATENT DOCUMENTS

| | | | |
|---|---|---|---|
| 2021/0152588 A1* | 5/2021 | Cruz | G06F 8/658 |
| 2022/0345477 A1* | 10/2022 | Criscione | H04L 63/20 |
| 2024/0056482 A1* | 2/2024 | Ignatius | H04L 63/1433 |

* cited by examiner

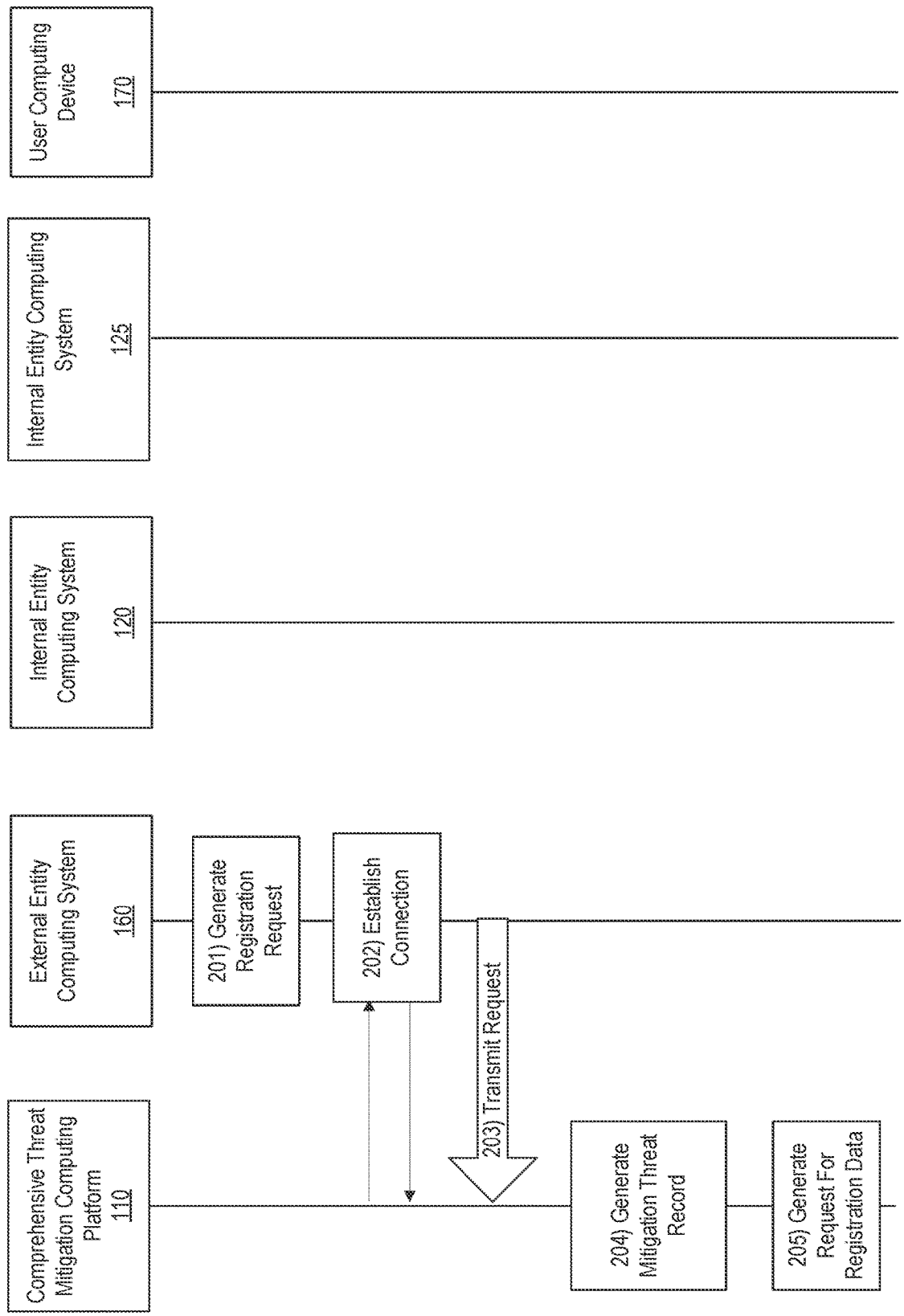

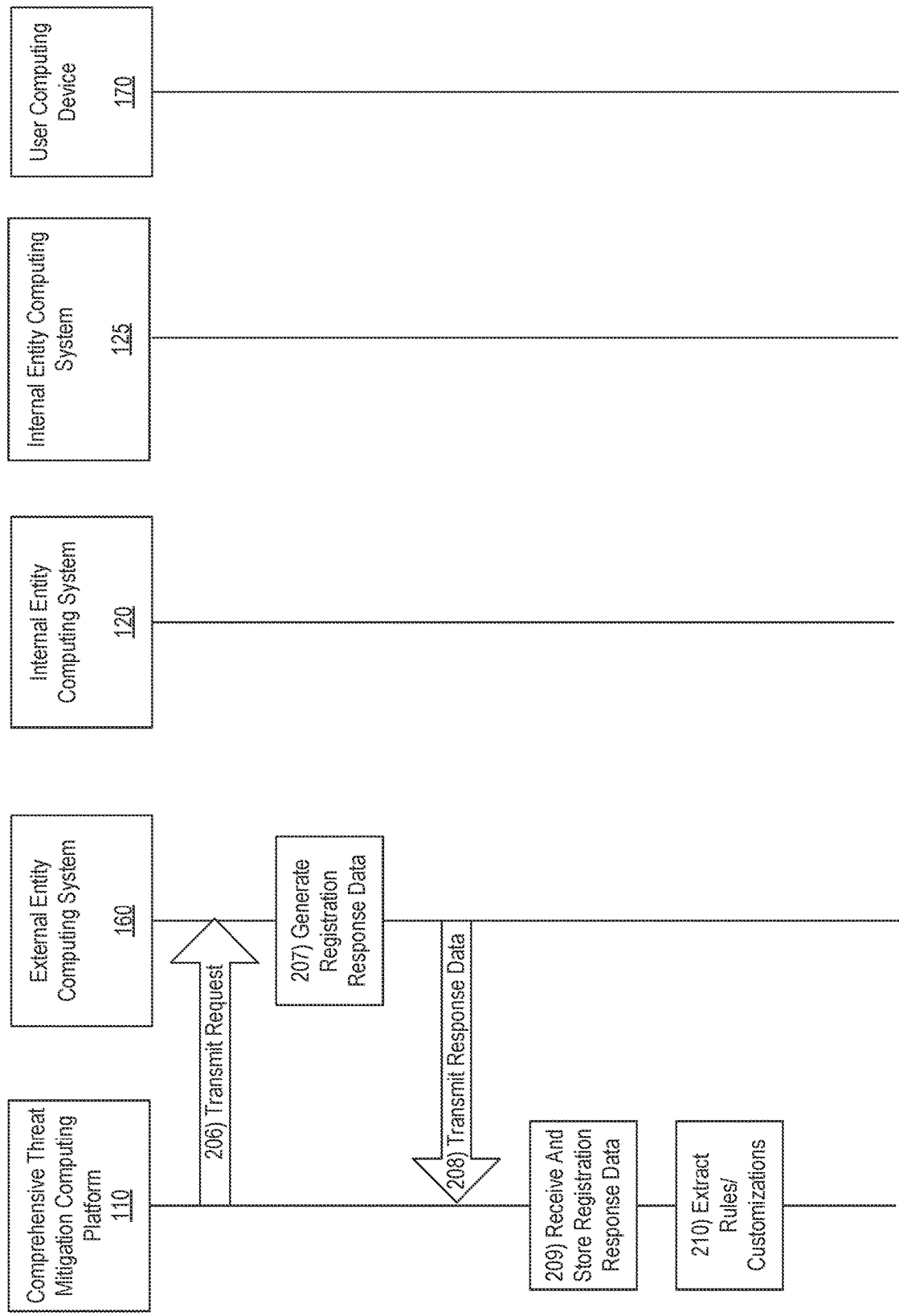

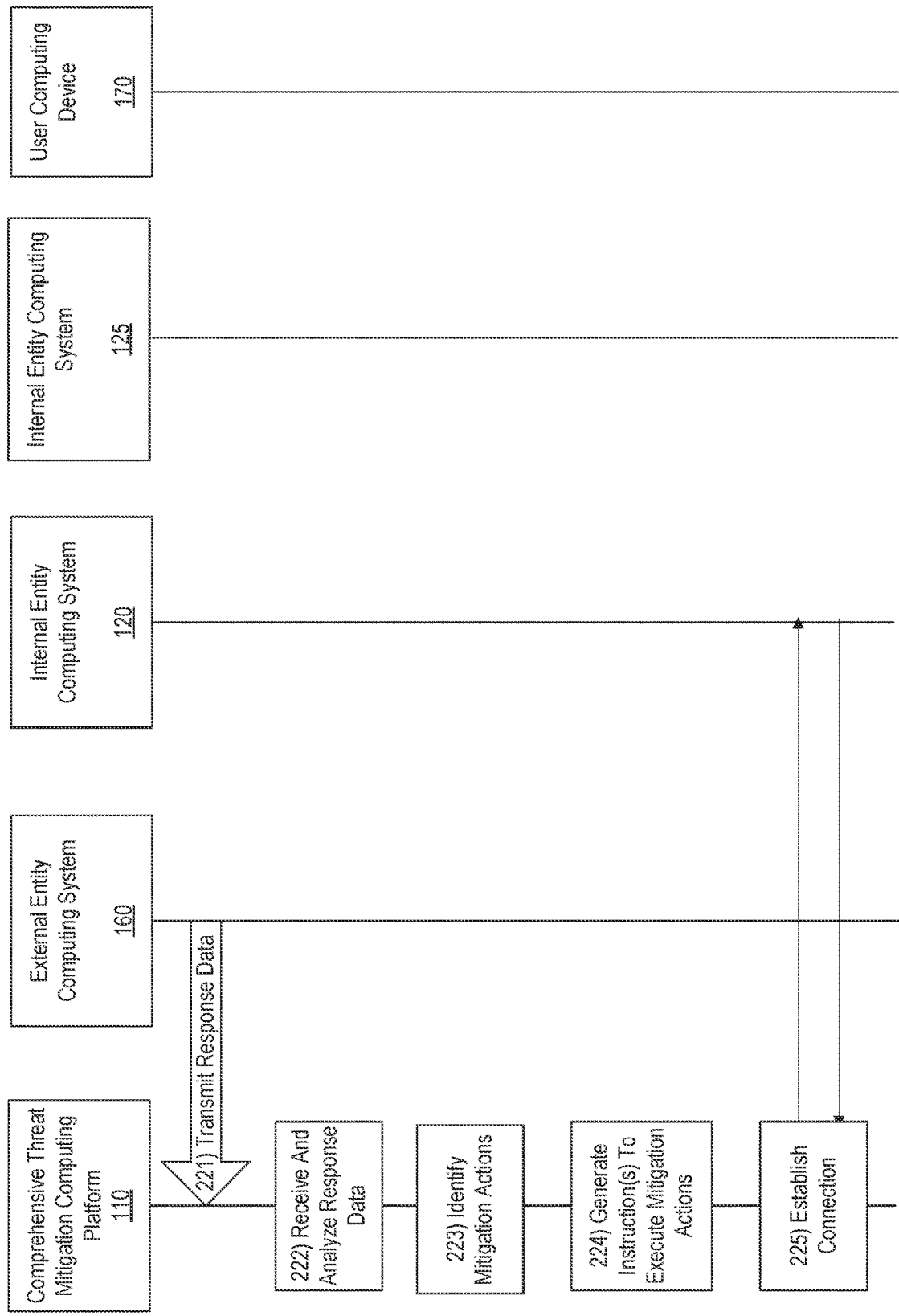

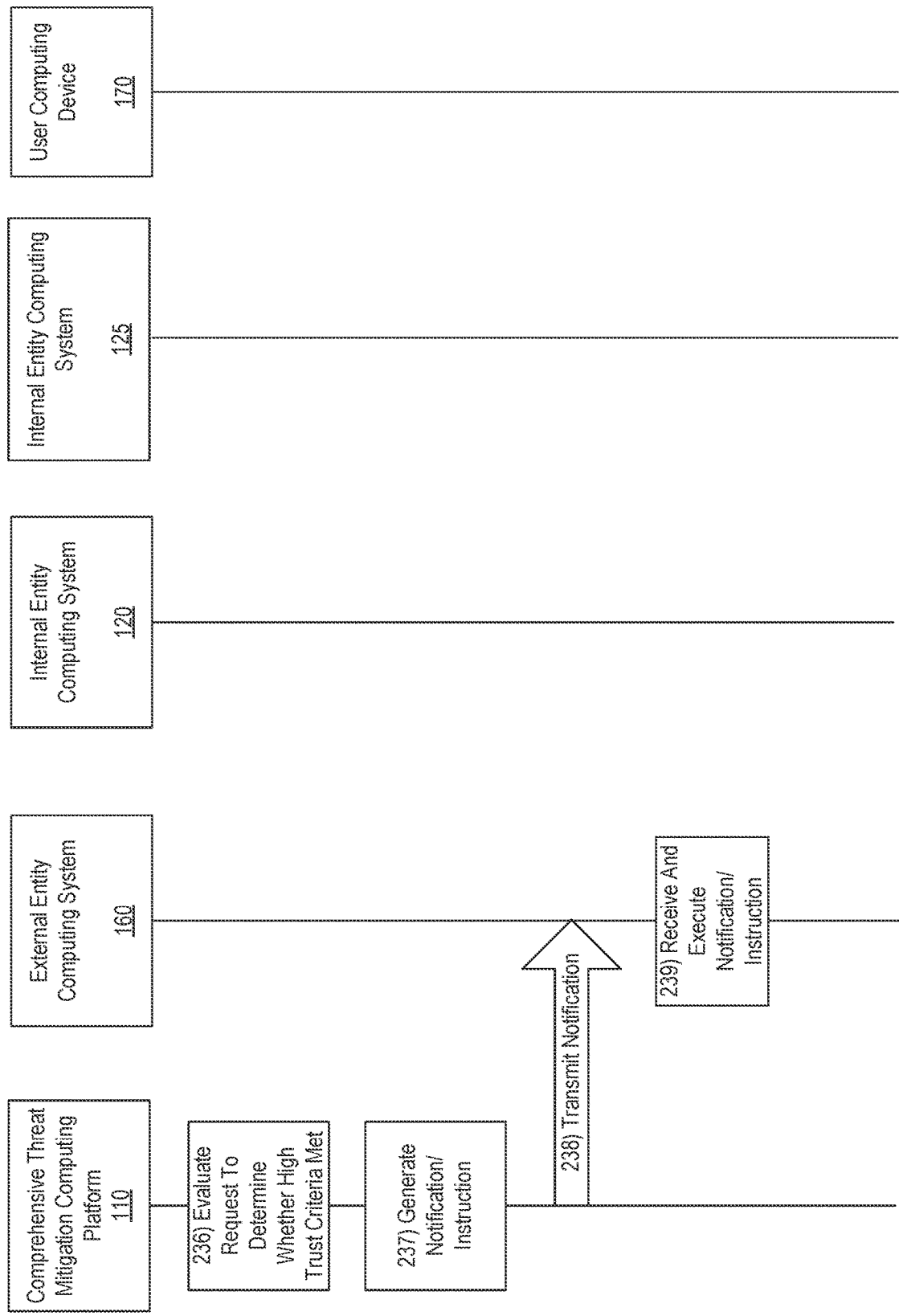

Attention!

Mitigating Actions Have Been Executed for Entity 1

Please Expect to Receive Phone Calls From Alternate Number:

(XXX) XXX-XXXX

MULTI-COMPUTER SYSTEM FOR COMPREHENSIVE THREAT DETECTION AND MITIGATION

BACKGROUND

Aspects of the disclosure relate to electrical computers, systems, and devices for comprehensive threat detection and mitigation.

Cybersecurity threats are continuous issues for entities and individuals. When a cybersecurity threat is detected or suspected, it is critical that mitigating actions be identified and executed quickly to mitigate any damage due to the threat. However, during a threat situation, it can be difficult to identify all entities that need to be informed, request changes or security measures, and the like, in a timely manner. Further, modifying systems associated with entities other than the one associated with the threat can be cumbersome and inefficient. Accordingly, it would be advantageous to provide a single point of contact for reporting a threat or potential threat that would then modify various systems, communicate with other entities, and the like.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with comprehensive threat mitigation.

In some aspects, an indicate of threat or potential threat may be received from an external entity. In some examples, the threat may include a cybersecurity threat. In response to receiving the indication of threat, identifying data associated with the external entity may be extracted from the indication and used to retrieve pre-stored customizations or rules associated with the desired mitigating actions of the external entity.

The retrieved rules or customizations may be used to identify one or more requirements for executing comprehensive mitigating actions for the external entity. If those requirements are met by the data received (e.g., if sufficient data has been received to authenticate and validate the request or indication) the data may be compared to pre-stored authentication and/or validation data to determine whether the indication is validated and authenticated.

If sufficient information is not received, a request for additional data may be generated and transmitted to the external entity. Response data may be received from the external entity and compared to pre-stored data to determine whether the indication is validated and authenticated.

If the indication is validated and authenticated, one or more mitigating actions may be identified. In some examples, the one or more mitigating actions may be customized by the external entity and may be stored in the rules and customizations. The one or more mitigating actions may include actions taken at the external entity, at an enterprise organization receiving the indication, at other external entities, or the like.

Instructions to execute the one or more mitigating actions may be generated and transmitted to one or more computing devices for execution.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for implementing comprehensive threat mitigation functions in accordance with one or more aspects described herein;

FIG. 4 illustrates one example user interface that may be generated in accordance with one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, detecting and mitigating cybersecurity threats is a critical part of everyday business for entities and everyday life for individuals. When a cybersecurity threat is detected or suspected, it can be difficult to quickly notify all appropriate entities, execute mitigating actions to avoid harm, and the like.

Accordingly, aspects described herein are directed to a single point of notification for detected or suspected cybersecurity threats. The single point of notification may permit customization of mitigating actions executed for each entity or user. In some examples, a request for comprehensive mitigating actions or an indication of a threat or potential threat may be received by the system and, if validated and authenticated, one or more mitigating actions may be identified and executed. In some examples, executing mitigating actions may include generating and transmitting instructions to a plurality of computing systems or devices associated with the external entity, with the enterprise organization, with other external entities, or the like. In some examples, mitigating actions may include modifying systems or system requirements for the external entity, enterprise organization, or the like, initiating communications via an alternate communication channel, and the like.

To cease mitigating actions, in some examples, high trust criteria associated with the request to cease mitigating actions must be met.

These and various other arrangements will be discussed more fully below.

Figure 1A:
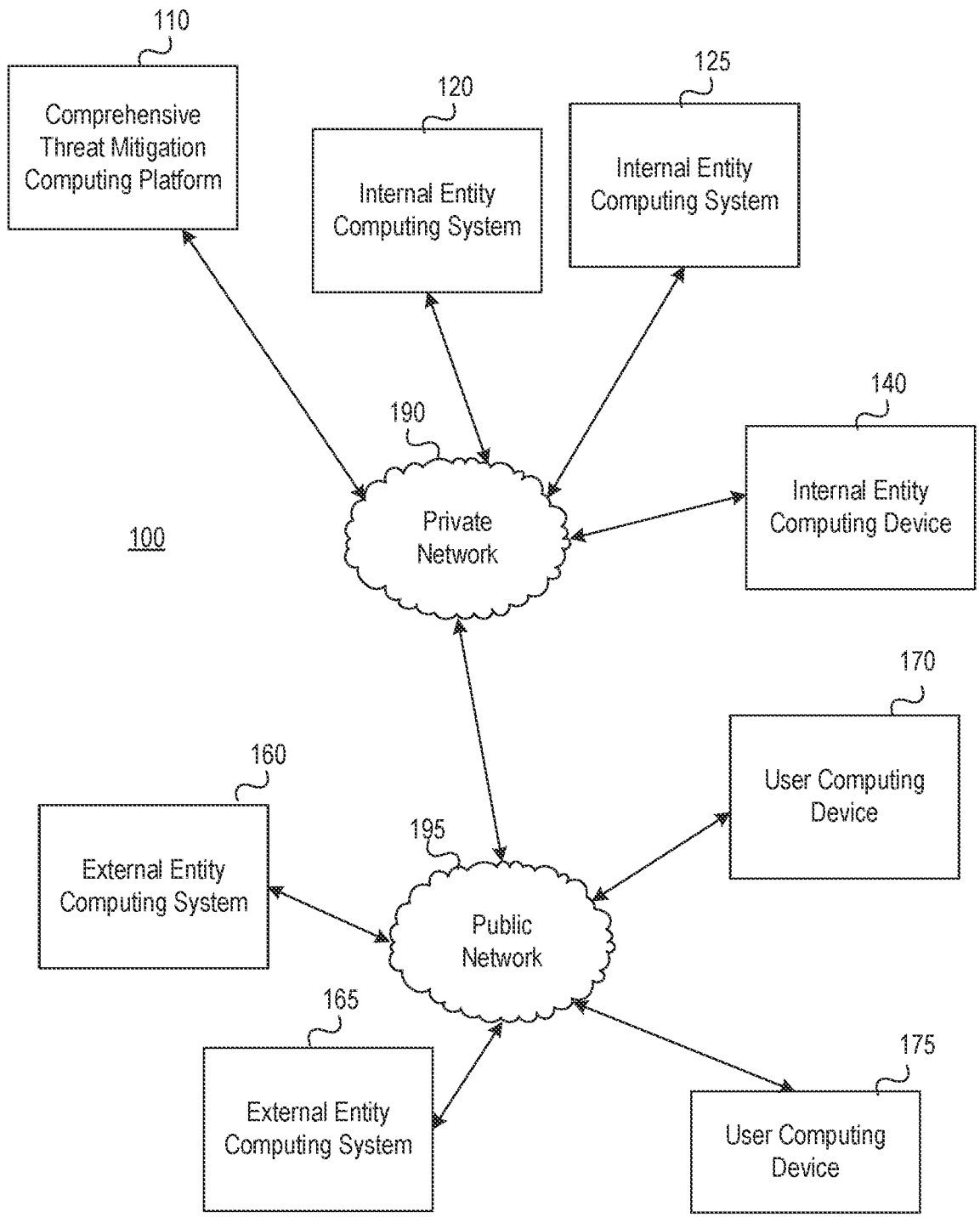
FIGS. 1A and 1B depict an illustrative computing environment for implementing comprehensive threat mitigation functions in accordance with one or more aspects described herein.
Figure 1B:
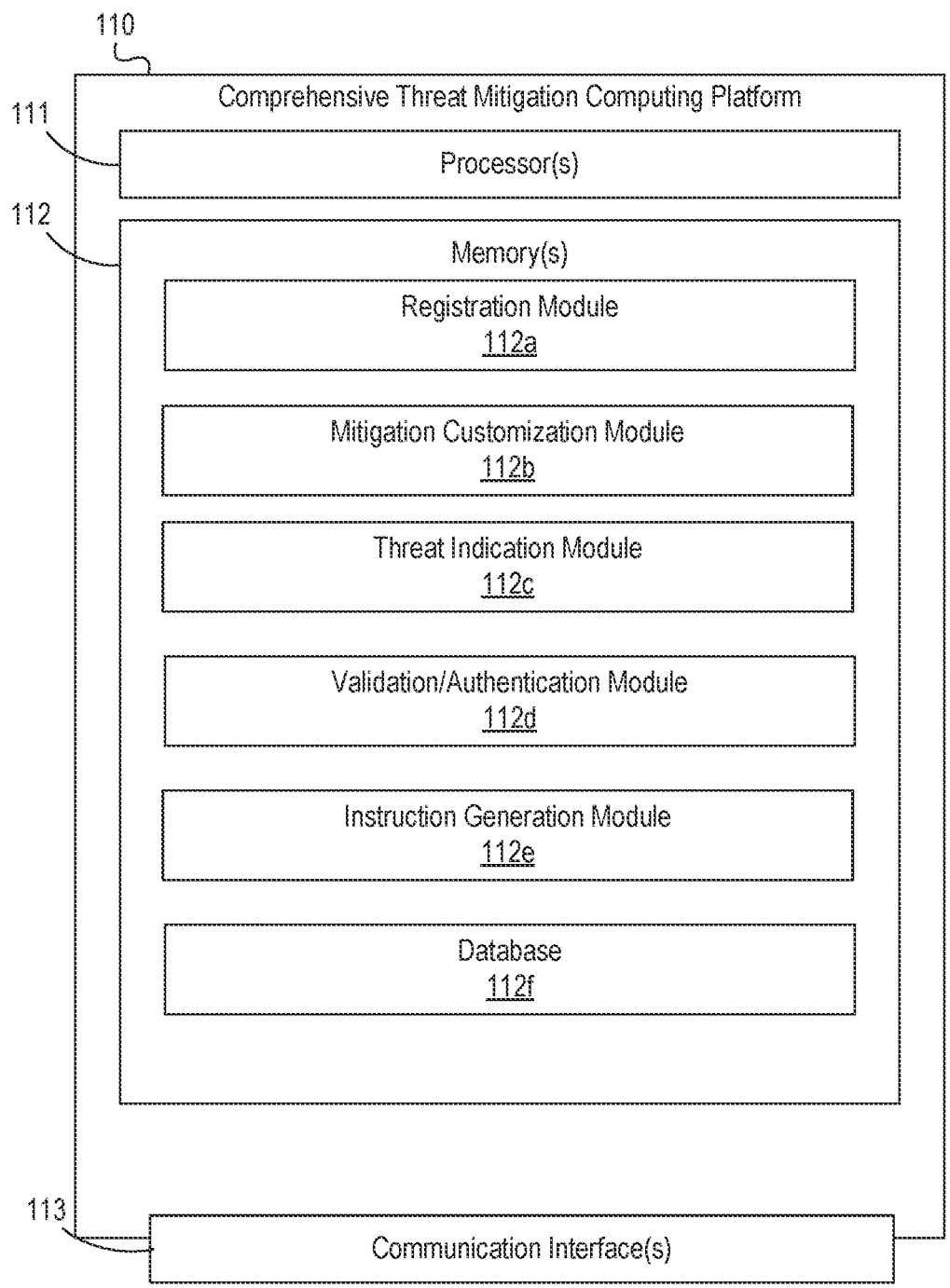

FIGS. 1A-1B depict an illustrative computing environment for implementing comprehensive threat mitigation functions in accordance with one or more aspects described herein. Referring to FIG. 1A, computing environment 100 may include one or more computing devices and/or other computing systems. For example, computing environment 100 may include comprehensive threat mitigation computing platform 110, internal entity computing system 120, internal entity computing system 125, internal entity computing device 140, external entity computing system 160, external entity computing system 165, user computing device 170 and user computing device 175. Although two internal entity computing systems 120, 125, one internal entity computing device 140, two external entity computing systems 160, 165 and two user computing devices 170, 175 are shown, any number of systems or devices may be used without departing from the invention.

Comprehensive threat mitigation computing platform 110 may be configured to perform intelligent, dynamic and efficient evaluation of potential threats or threat indicators and execute one or more mitigation actions or functions. For instance, comprehensive threat mitigation computing platform 110 may store customized threat mitigation data, rules, and the like, for a plurality of entities. Further, comprehensive threat mitigation computing platform 110 may store authentication and/or validation data for each entity to ensure that any reported threats are valid or are received from authenticated users associated with a respective entity. In some examples, comprehensive threat mitigation computing platform 110 may host or execute, or communicate with devices hosting or executing, one or more software applications (e.g., customer facing software applications) configured to provide services to customers (e.g., external entities) and through which a customer may register with the services provided herein, may select one or more customizable options, may modify previously selected options, and the like.

Comprehensive threat mitigation computing platform 110 may receive an indication of a threat or potential threat from one or more entities or entities devices, such as external entity computing system 160, external entity computing system 165, or the like. The indication may include details associated with the threat (e.g., type of threat, potential severity, or the like) or may be a generic indication of a threat that may then cause comprehensive mitigation actions to be identified by the comprehensive threat mitigation computing platform 110 and executed.

For instance, upon receiving the threat indication, comprehensive threat mitigation computing platform 110 may request authentication or validation data from the entity to confirm that the threat is being received from an authenticated or validated user. Responsive to validating or authenticating the threat indication, comprehensive threat mitigation computing platform 110 may identify one or more customized comprehensive mitigation actions associated with the entity indicating the threat or potential threat. In some examples, comprehensive mitigating actions may include freezing all accounts associated with the entity, modifying systems of the enterprise organization implementing the comprehensive threat mitigation computing platform 110 to require additional authentication data prior to executing any transactions, informing security or law enforcement personnel, transitioning to an alternate form of communication, or the like.

The comprehensive mitigating actions may remain in place until a threat is resolved, until a request to remove the actions is received, or the like. In some examples, one or more notifications may be generated and transmitted to one or more devices indicating that mitigating actions have been executed.

Computing environment 100 may further include internal entity computing system 120, internal entity computing system 125, and the like. Internal entity computing systems 120, 125 may include one or more computing devices (e.g., servers, server blades, desktop computers, or the like) that may host or execute one or more applications used in executing business functions of the enterprise organization. For instance, internal entity computing system 120, internal entity computing system 125, may host one or more applications for executing transactions, modifying account balances, providing or approving loans, and the like. Accordingly, one or more mitigating actions may be transmitted to one or more of internal entity computing system 120, 125 to modify operation of the applications in order to mitigate potential damage caused by an indicated threat. For instance, one or more of internal entity computing system 120, 125 may execute an instruction freezing all accounts associated with an external entity indicating a threat or potential threat.

Computing environment 100 may further include internal entity computing device 140. Internal entity computing device 140 may be a computing device (e.g., laptop computer, desktop computer, tablet device, or the like) associated with or operated by a user of the enterprise organization. Internal entity computing device 140 may receive and display notifications related to mitigating actions executed, may modify or adjust parameters associated with the comprehensive threat mitigation computing platform 110, or the like.

External entity computing system 160, external entity computing system 165, and the like, may including one or more computing devices (e.g., servers, server blades, desktop computers, or the like) associated with entities external to the enterprise organization implementing the comprehensive threat mitigation computing platform 110. For instance, external entity computing system 160, external entity computing system 165, and the like, may be associated with one or more registered user entities that may, in some examples, be customers of the enterprise organization. In some examples, external entity computing system 160, external entity computing system 165, and the like, may transit a notification of threat or potential threat, may receive and execute instructions associated with mitigating actions, and the like.

User computing device 170, user computing device 175, and the like, may be computing devices (e.g., laptop computers, desktop computers, tablet devices, smartphones, or the like) associated with one or more users. In some examples, user computing device 170, user computing device 175, or the like, may be associated with users affiliated with one or more external entities. User computing device 170, user computing device 175, or the like, may be registered devices configured to be used as alternate forms of communication for an entity should a threat compromise one or more primary sources of communication.

As mentioned above, computing environment 100 also may include one or more networks, which may interconnect one or more of comprehensive threat mitigation computing platform 110, internal entity computing system 120, internal entity computing system 125, internal entity computing device 140, external entity computing system 160, external entity computing system 162, user computing device 170 and/or user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, comprehensive threat mitigation computing platform 110, internal entity computing system 120, internal entity computing system 125, and internal entity computing device 140, may be associated with an enterprise organization (e.g., a financial institution), and private network 190 may be associated with and/or operated by the organization, and may include one or more networks (e.g., LANs, WANs, virtual private networks (VPNs), or the like) that interconnect comprehensive threat mitigation computing platform 110, internal entity computing system 120, internal entity computing system 125, and internal entity computing device 140, and one or more other computing devices and/or computer systems that are used by, operated by, and/or otherwise associated with the organization. Public network 195 may connect private network 190 and/or one or more computing devices connected thereto (e.g., comprehensive threat mitigation computing platform 110, internal entity computing system 120, internal entity computing system 125, internal entity computing device 140) with one or more networks and/or computing devices that are not associated with the organization. For example, external entity computing system 160, external entity computing system 162, user computing device 170 and/or user computing device 175, might not be associated with an organization that operates private network 190 (e.g., because external entity computing system 160, external entity computing system 162, user computing device 170 and/or user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 160, external entity computing system 162, user computing device 170 and/or user computing device 175 to private network 190 and/or one or more computing devices connected thereto (e.g., comprehensive threat mitigation computing platform 110, internal entity computing system 120, internal entity computing system 125, internal entity computing device 140).

Referring to FIG. 1B, comprehensive threat mitigation computing platform 110 may include one or more processors 111, memory 112, and communication interface 113. A data bus may interconnect processor(s) 111, memory 112, and communication interface 113. Communication interface 113 may be a network interface configured to support communication between comprehensive threat mitigation computing platform 110 and one or more networks (e.g., private network 190, public network 195, or the like). Memory 112 may include one or more program modules having instructions that when executed by processor(s) 111 cause comprehensive threat mitigation computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of comprehensive threat mitigation computing platform 110 and/or by different computing devices that may form and/or otherwise make up comprehensive threat mitigation computing platform 110.

For example, memory 112 may have, store and/or include registration module 112a. Registration module 112a may store instructions and/or data that may cause or enable the comprehensive threat mitigation computing platform 110 to receive a registration request for an entity system, such as external entity computing system 160, 165, and generate a registration record associated with the entity. In some examples, registration module 112a may generate a request for additional registration data, such as authentication or validation data, customized mitigating actions, and the like, may be transmit the request to the external entity computing system 160, 165. Response data may be received and stored by the comprehensive threat mitigation computing platform 110.

Comprehensive threat mitigation computing platform 110 may further have, store and/or include mitigation customization module 112b. Mitigation customization module 112b may store instructions and/or data that may cause or enable the comprehensive threat mitigation computing platform 110 to store one or more customized mitigating actions received from one or more external entities. For instance, during a registration process, one or more external entities may transmit customized mitigation actions to be executed upon an indication of a threat or potential threat. These mitigation actions may be stored by mitigation customization module 112b and deployed upon receiving an indication of a threat or potential threat.

Comprehensive threat mitigation computing platform 110 may further have, store and/or include threat indication module 112c. Threat indication module 112c may store instructions and/or data that may cause or enable the comprehensive threat mitigation computing platform 110 to receive an indication of a threat or potential threat, extract data from the indication and execute one or more actions based on the extracted data. For instance, data associated with an entity from which the indication is received may be extracted and validation information, mitigating actions, etc. may be retrieved.

Comprehensive threat mitigation computing platform 110 may further have, store and/or include validation/authentication module 112d. Validation/authentication module 112d may store instructions and/or data that may cause or enable the comprehensive threat mitigation computing platform 110 to receive and store validation and/or authentication requirements for executing one or more mitigating actions. For instance, upon receiving an indication of a threat or potential threat, validation/authentication module 112d may confirm that the indication is valid and/or that the user or entity transmitting the indication is authenticated. In some examples, comprehensive threat mitigation computing platform 110 may request authentication information from the entity from which the indication was received prior to identifying and/or executing one or more mitigating actions. In some examples, validation of the indication may include confirming that the indication was received from a pre-registered device (e.g., based on unique identifier associated with the device), may include transmitting a one-time passcode to a pre-registered device that must be received by the comprehensive threat mitigation computing platform 110, or the like.

Comprehensive threat mitigation computing platform 110 may further have, store and/or include instruction generation module 112e. Instruction generation module 112e may store instructions and/or data that may cause or enable the comprehensive threat mitigation computing platform 110 to generate one or more instructions to execute one or more mitigating actions and transmit the instructions to one or more computing systems or devices. For instance, one or more instructions to execute one or more mitigating actions selected by an external entity may be generated (e.g., based on stored preferences of the external entity) and transmitted to one or more internal systems (e.g., internal entity computing system 120, 125), external systems (e.g., external entity computing system 160, 165) or the like.

Comprehensive threat mitigation computing platform 110 may further have, store and/or include a database 112f. Database 112f may store data associated with previous mitigating actions, FIGS. 2A-2H depict one example illustrative event sequence for implementing comprehensive threat mitigation functions in accordance with one or more aspects described herein. The events shown in the illustrative event sequence are merely one example sequence and additional events may be added, or events may be omitted, without departing from the invention. Further, one or more processes discussed with respect to FIGS. 2A-2H may be performed in real-time or near real-time.

With reference to FIG. 2A, at step 201, a registration request may be generated by an external entity computing system 160. For instance, a user at the external entity may input, via one or more input devices, to the external entity computing system 160, a request to register with the enterprise organization and the comprehensive threat mitigation computing platform 110. Accordingly, a registration request may be generated based on the user input received.

At step 202, a connection may be established between external entity computing system and comprehensive threat mitigation computing platform 110. For instance, a first wireless connection may be established between the external entity computing system 160 and the comprehensive threat mitigation computing platform 110. Upon establishing the first wireless connection, a communication session may be initiated between comprehensive threat mitigation computing platform 110 and external entity computing system 160.

At step 203, the external entity computing system 160 may transmit the registration request to the comprehensive threat mitigation computing platform 110. For instance, the registration request may be transmitted during the communication session initiated upon establishing the first wireless connection.

At step 204, the registration request may be received by the comprehensive threat mitigation computing platform 110 may a mitigation threat record may be generated. For instance, one or more databases may be modified to include a record associated with the external entity from which the request was received.

At step 205, comprehensive threat mitigation computing platform 110 may generate a request for registration data. For instance, data associated with devices of the entity, validation/authentication data, mitigation action preferences, and the like, may be requested.

With reference to FIG. 2B, at step 206, the comprehensive threat mitigation computing platform 110 may transmit the request for registration data to the external entity computing system 160. In some examples, the request may be transmitted during the communication session initiated upon establishing the first wireless connection.

At step 207, registration response data may be generated by the external entity computing system 160. For instance, the request for registration data may be received and analyzed. Response data including data responsive to the requests may be identified and registration response data may be generated.

At step 208, the registration response data may be transmitted by the external entity computing system 160 to the comprehensive threat mitigation computing platform 110. For instance, the response data may be transmitted during the communication session initiated upon establishing the first wireless connection or a new connection and communication session may be established and initiated.

At step 209, the registration response data may be received and stored. For instance, the mitigation threat record associated with the external entity may be updated to include the received registration response data. In some examples, the registration response data may include identifiers of particular devices associated with the external entity, identifiers of particular devices to be used as alternate forms of communication should a threat arise, identification of one or more mitigating actions to execute upon receiving an indication of a threat or potential threat, authentication and/or validation data for use in authenticating one or more users or validating an indication of a threat, and the like.

At step 210, one or more customizations and/or rules (e.g., preferences for authenticating/validating, types of mitigating actions to implement, tiered implementation of mitigating actions, or the like) may be extracted from the registration response data and stored in various modules of the comprehensive threat mitigation computing platform 110, as discussed herein.

Figure 2C:
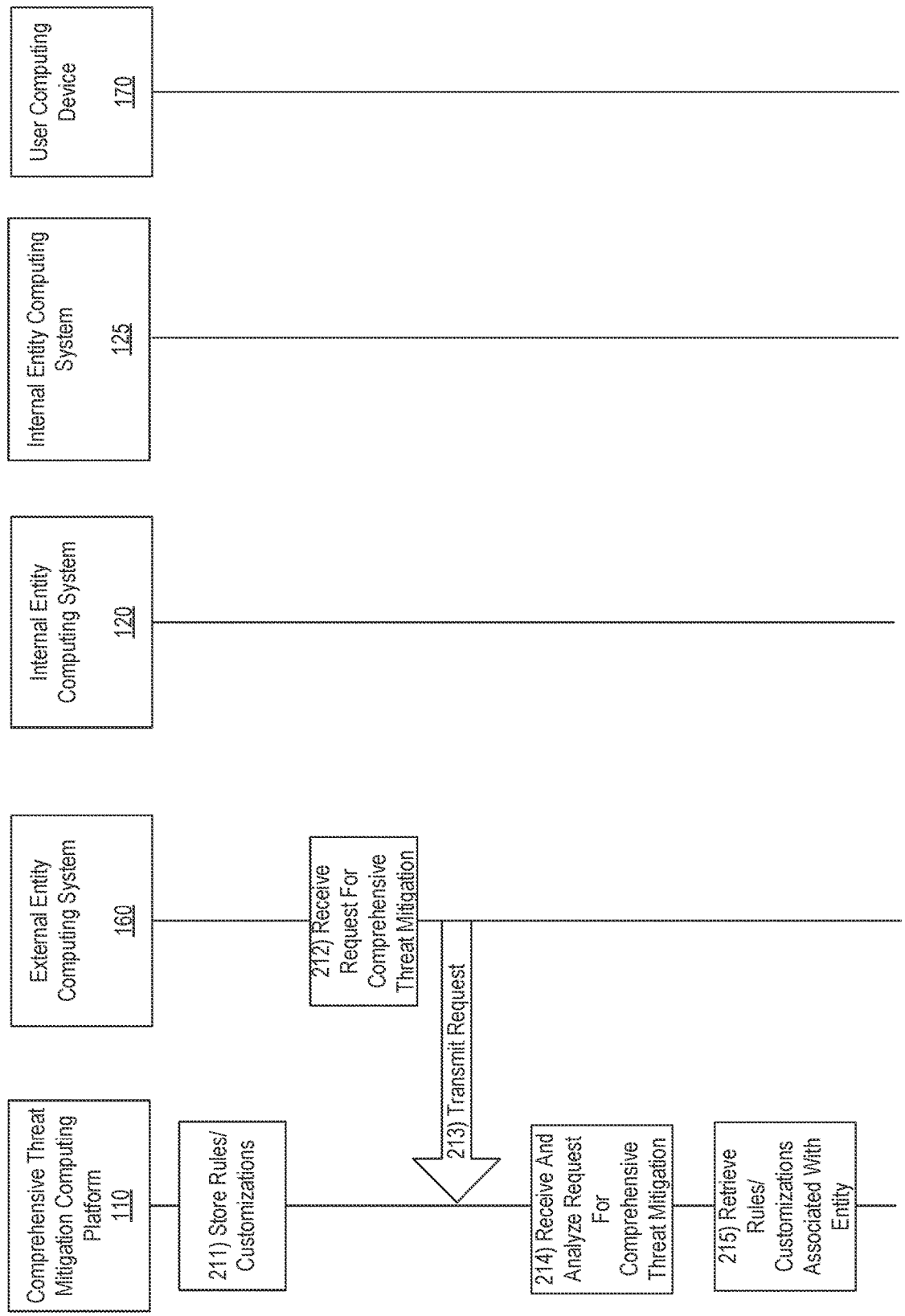

With reference to FIG. 2C, at step 211, the extracted rules and/or customizations may be stored in the comprehensive threat mitigation computing platform 110. For instance, one or more customization options may be stored in mitigation customization module 112b. In another example, extracted validation/authentication data may be stored in validation/authentication module 112d.

At step 212, an external entity computing system, such as external entity computing system 160, may receive a request for comprehensive threat mitigation or indication of a cybersecurity threat or potential threat. In some examples, initiating the request for comprehensive threat mitigation may, with a single request, cause one or more mitigating actions to execute. In some examples, the one or more mitigating actions may be performed by or associated with the enterprise organization implementing the comprehensive threat mitigation computing platform 110. Additionally or alternatively, the one or more mitigating actions may be performed by other entities informed by the enterprise organization. Accordingly, in at least some examples, the external entity may submit a single request for comprehensive threat mitigation that is transmitted to comprehensive threat mitigation computing platform 110, which may initiate one or more mitigating actions at the enterprise organization and/or at other external entities.

In some examples, the request may be received via a designated computing device that is part of the external entity computing system 160. Additionally or alternatively, the request may be received via an application executing on the external entity computing system 160, such as a designated threat mitigation application, online banking application, customer portal in communication with the enterprise organization, or the like.

In some arrangements, the indication of threat or request for comprehensive mitigating actions may include additional data received therewith. For instance, data including a device identifier receiving the indication, a name or identifier of the external entity, a name or identifier of a user inputting the request or indication, or the like, may be received.

At step 213, the received request may be transmitted e.g., via a secure communication channel or using a secure or encrypted communication, by the external entity computing system 160 to the comprehensive threat mitigation computing platform 110. For instance, the request may be transmitted during the communication session, which may be a secure communication session, initiated upon establishing the first wireless connection. In other examples, another wireless connection may be established and an additional communication session may be initiated.

At step 214, the comprehensive threat mitigation computing platform 110 may receive the request for comprehensive threat mitigation or indication of a threat or potential threat and may analyze the request. For instance, the comprehensive threat mitigation computing platform 110 may extract data related to the external entity from which the request or indication was received, a user associated with the external entity and submitting the request, a type of threat, and the like.

At step 215, information extracted from the request for comprehensive threat mitigation or indication of threat or potential threat (e.g., external entity name, external entity device identifier, or the like) may be used to retrieve one or more rules and/or customizations associated with the external entity and stored by the comprehensive threat mitigation computing platform 110. For instance, validation/authentication options or customizations, mitigating action customizations, and the like, may be retrieved.

Figure 2D:
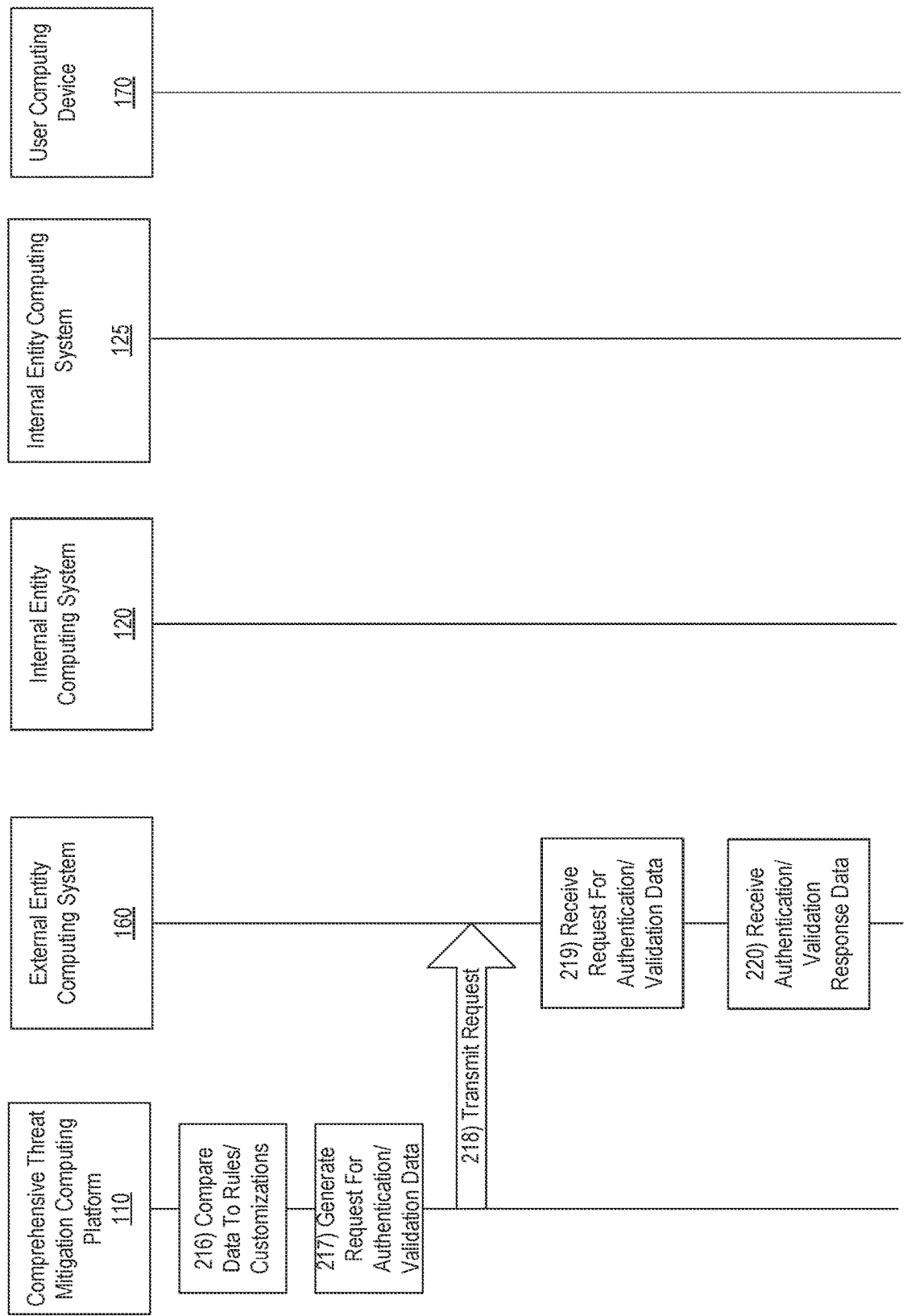

With reference to FIG. 2D, at step 216, the information received in the request/indication may be compared to the rules and/or customizations retrieved to determine if sufficient data is present, whether additional validation/authentication is required, or the like. If so, the process may move to step 222 where data is analyzed.

If, at step 216, sufficient information is not present, at step 217, a request for authentication/validation data may be generated. For instance, a request including particular items needed for authentication or validation (e.g., communication from a pre-registered device, user authentication data, or the like) may be generated.

At step 218, the request for authentication/validation data may be transmitted to the external entity computing system 160. In some examples, the request may be transmitted via a secure communication channel or may be encrypted. At step 219, the request may be received by the external entity computing system 160 and displayed by a display of the external entity computing system 160.

At step 220, authentication/validation response data may be received by the external entity computing system 160 via the secure communication channel or may be encrypted. For instance, user input may be provided including the requested authentication/validation data. In some examples, communication from a particular, pre-registered device associated with or in communication with the external entity computing system 160 may be received.

With reference to FIG. 2E, at step 221, external entity computing system 160 may transmit the authentication/validation response data received at step 220 to the comprehensive threat mitigation computing platform 110.

At step 222, the authentication/validation response data (or, if sufficient data was present at step 216, the data received with the indication of a threat or potential threat) may be received and/or analyzed. For instance, the information received with the indication of threat or potential threat and/or the authentication/validation response data may be analyzed by comparing data to one or more rules and/or customizations. For instance, received authentication data may be compared to pre-stored authentication received during a registration process to determine that the user transmitting the indication is authorized to do so and action should be taken. Additionally or alternatively, one or more device identifiers may be compared to device identifiers for pre-registered devices to determine whether the request is received from a validated device.

At step 223, in response to determining that the data meets the one or more rules/customizations (e.g., that the request is validated/authenticated), one or more mitigating actions may be identified. For instance, in some examples, based on customization data provided by the external entity (e.g., during the registration process) one or more mitigating actions may be identified. In some examples, mitigating actions may include generating and transmitting a plurality of notifications to one or more pre-set or predetermined business groups, internal or external entities or entity systems, and the like, suspending all transactions associated with accounts of the external entity, suspending or blocking some transactions, delaying transactions for a predefined time period (e.g., one day, one week, or the like), blocking online logins to one or more accounts or systems, freezing all accounts of the external entity, causing communication with the external entity via an alternate communication channel or device, requiring additional authentication data for transactions or requests from the external entity, modifying one or more systems of the enterprise organization to include particular requirements or rules associated with mitigating actions, and the like. In some examples, mitigating actions may include transmitting notifications to one or more other external entities, such as security personnel, law enforcement, other external entities that may be at risk or may be impacted by the mitigating actions, or the like. In some examples, one or more mitigating actions may include closing existing accounts of the external entity, opening new accounts for the external entity and automatically migrating data from the closed accounts to the newly opened accounts. In some arrangements, mitigating actions may include stopping or modifying an enterprise resource planning feed or application to protect various systems. In some arrangements, this action may be performed automatically as part of the executed mitigating actions in response to the indication of a threat or potential threat and without an additional or specific request from the external entity.

In some examples, mitigating actions may be identified to protect the external entity and the enterprise organization. For instance, if the enterprise organization is a financial institution hosting several accounts of the external entity, identifying one or more mitigating actions may include identifying actions to execute to protect the external entity and/or the enterprise organization (e.g., the enterprise organization may freeze or limit access to the external entity accounts (e.g., even if the external entity has not requested that action), the enterprise organization may initiate an investigation or risk assessment to assess risk to the enterprise organization associated with the threat or potential threat, the enterprise organization may communicate a potential issue to other partner entities, customers, or the like, that may be impacted by the threat or potential threat, or the like).

At step 224, one or more instructions causing the identified mitigating actions to execute may be generated. For instance, one or more instructions or commands identifying one or more mitigating actions and configured to cause execution of the mitigating actions on, for instance, one or more other computing devices or systems, may be generated.

At step 225, a connection may be established between internal entity computing system 120 and comprehensive threat mitigation computing platform 110. For instance, a second wireless connection may be established between the internal entity computing system 120 and the comprehensive threat mitigation computing platform 110. Upon establishing the second wireless connection, a communication session may be initiated between comprehensive threat mitigation computing platform 110 and internal entity computing system 120.

Figure 2F:
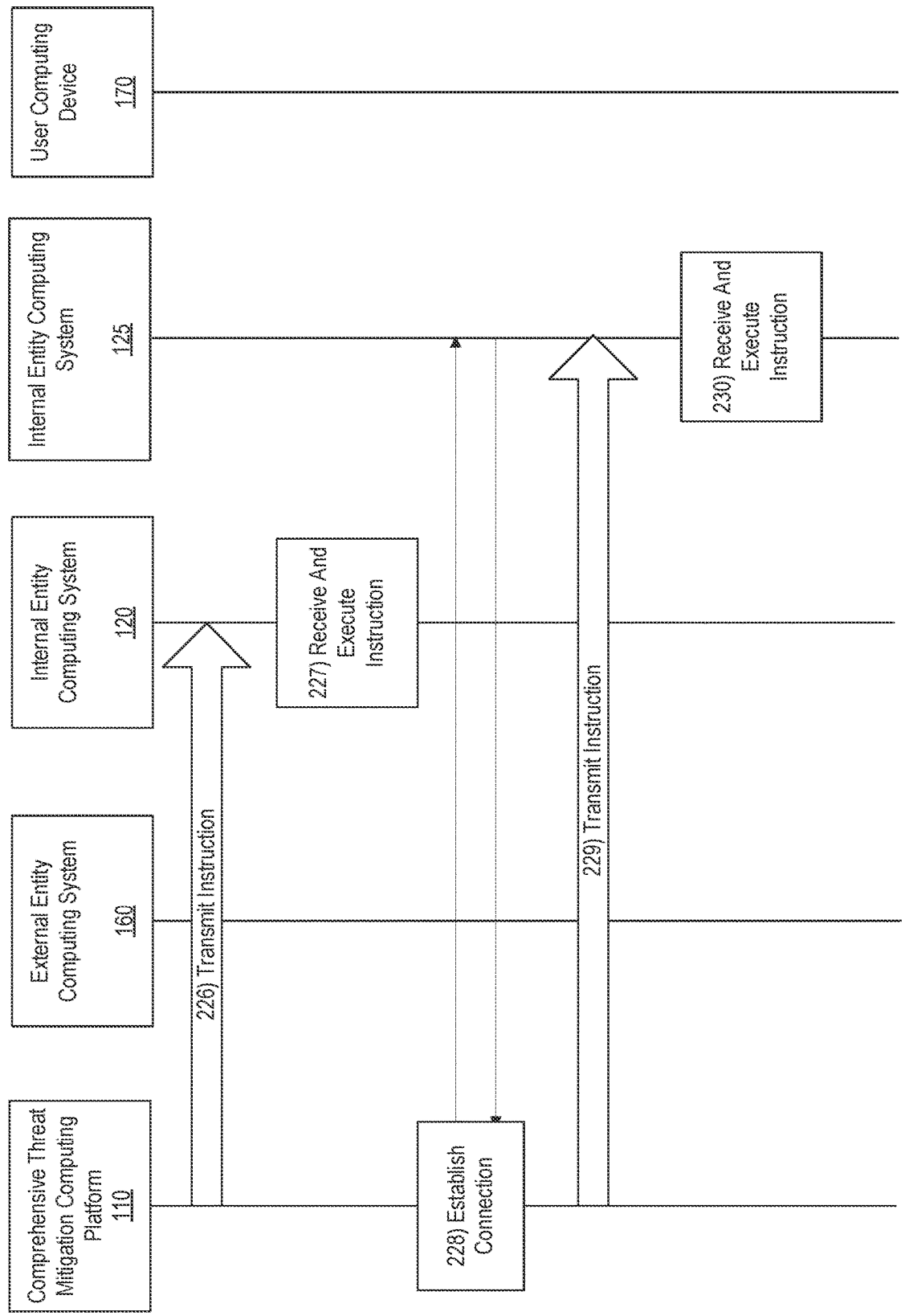

With reference to FIG. 2F, at step 226, the comprehensive threat mitigation computing platform 110 may transmit the one or more instructions to other devices or systems. For instance, the comprehensive threat mitigation computing platform 110 may transmit one or more instructions to execute one or more mitigating actions to internal entity computing system 120 during, for instance, the communication session initiated upon establishing the second wireless connection.

At step 227, internal entity computing system 120 may receive the one or more instructions and may execute the one or more instructions, causing mitigating actions to be in place.

At step 228, a connection may be established between internal entity computing system 125 and comprehensive threat mitigation computing platform 110. For instance, a third wireless connection may be established between the internal entity computing system 125 and the comprehensive threat mitigation computing platform 110. Upon establishing the third wireless connection, a communication session may be initiated between comprehensive threat mitigation computing platform 110 and internal entity computing system 125.

At step 229, the comprehensive threat mitigation computing platform 110 may transmit the one or more instructions to other devices or systems. For instance, the comprehensive threat mitigation computing platform 110 may transmit one or more instructions to execute one or more mitigating actions to internal entity computing system 125 during, for example, the communication session initiated upon establishing the third wireless connection.

At step 230, internal entity computing system 125 may receive the one or more instructions and execute the one or more instructions, causing mitigating actions to be in place.

In some examples, executing the instructions may cause internal entity computing system 120 and internal entity computing system 125 to transmit a notification to one or more business groups or entities that mitigating actions have been executed. FIG. 4 illustrates one example notification that may be generated and transmitted. For instance, notification 400 may indicate that mitigating actions have been executed for a particular entity and may identify at least one action (e.g., that alternate communications are in place and phone calls will be received from an alternate number of the entity).

In the example shown, identified instructions may be transmitted to two computing systems internal to the enterprise organization, internal entity computing system 120 and internal entity computing system 125. For instance, if internal entity computing system 120 hosts or executes applications or systems configured to control transaction processing, instructions causing suspension of any pending or requested transaction may be executed. Internal entity computing system 125 may control other aspects of enterprise organization business, such as authentication or validation. Accordingly, one or more instructions to modifying authentication requirements (e.g., requiring multi-factor authentication, preventing access to users in a designated group, only permitting access to users in a designated group, requiring alternate forms of authentication, or the like) associated with accounts, systems, or the like of the external entity may be received and executed by internal entity computing system 125. While two internal entity computing systems 120, 125 are shown, more or fewer may be used without departing from the invention.

Figure 2G:
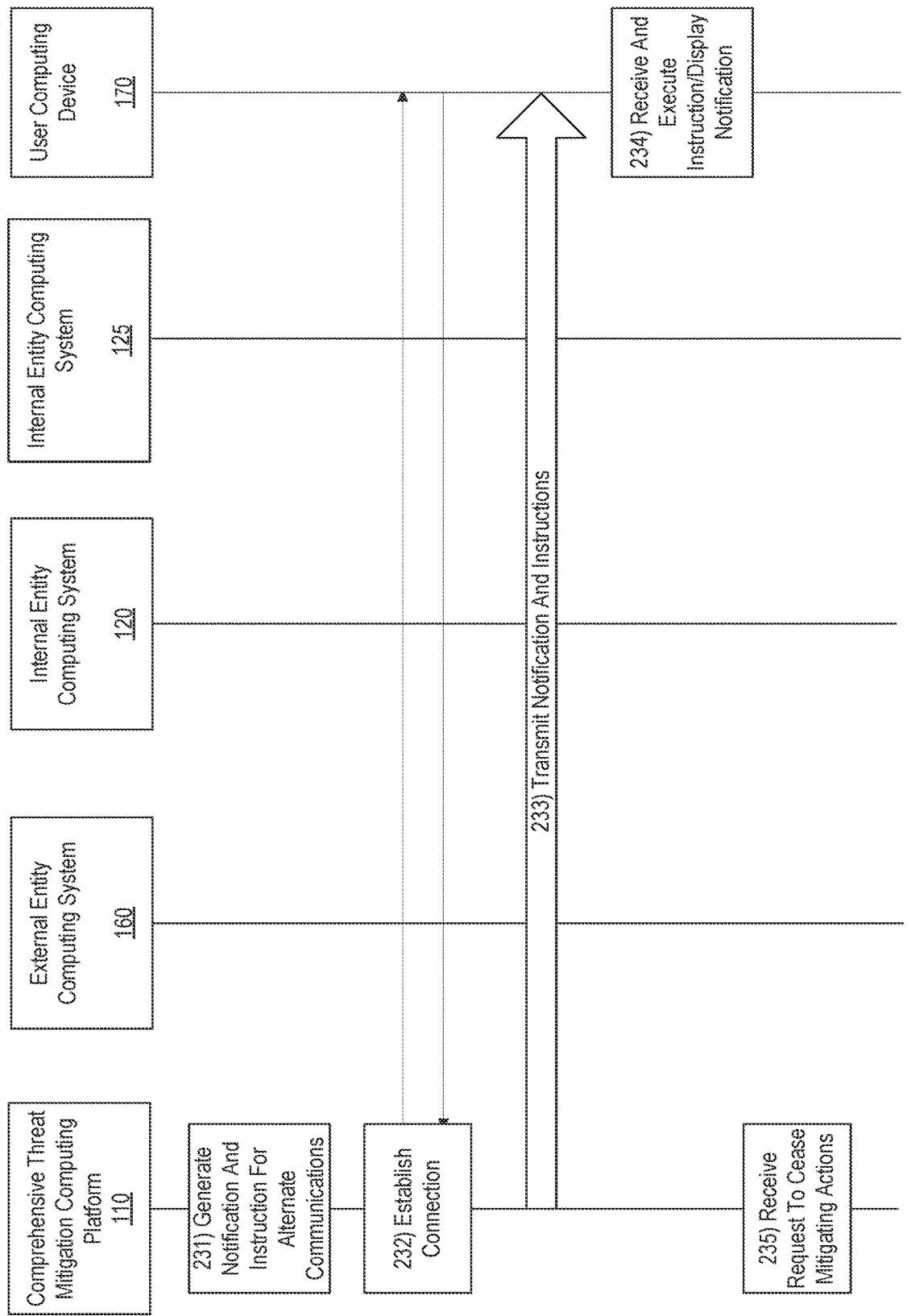

With reference to FIG. 2G, at step 231, in some examples, a notification and/or one or more instructions causing communication via an alternate channel or device may be generated. For instance, to prevent communication via a compromised or potentially compromised communication channel or device, in some examples, mitigating actions may include communicating via an alternate channel or device. Accordingly, at step 231, a notification and/or instruction to initiate alternate communications may be generated.

At step 232, a connection may be established between user computing device 170 and comprehensive threat mitigation computing platform 110. For instance, a fourth wireless connection may be established between the user computing device 170 and the comprehensive threat mitigation computing platform 110. Upon establishing the fourth wireless connection, a communication session may be initiated between comprehensive threat mitigation computing platform 110 and user computing device 170. In some examples, user computing device 170 may be a pre-registered user computing device associated with one or more users of the external entity and configured to provide alternate communications.

At step 233, the notification and/or instruction(s) may be transmitted by the comprehensive threat mitigation computing platform 110 to the user computing device 170. For instance, the notification and/or instruction(s) may be transmitted during the communication session initiated upon establishing the fourth wireless connection.

At step 234, the user computing device may receive and display/execute the notification and one or more instructions. For instance, the notification may be displayed by the display of the user computing device 170 and, in some examples, a test message may be transmitted to one or more other systems or devices to confirm that alternate communication is functioning properly and to notify, for instance, the enterprise organization that the notification and instruction have been received.

At step 235, a request to cease mitigating actions may be received by comprehensive threat mitigation computing platform 110. For instance, the request to cease mitigating actions may be received via a designated alternate communication channel or device, via a preregistered device, via external entity computing system 160, or the like.

With reference to FIG. 2H, at step 236, comprehensive threat mitigation computing platform 110 may evaluate the request to cease mitigating actions to determine whether it meets high trust criteria. For instance, in order to cease mitigating actions, the request must meet one or more high trust criteria. In some examples, high trust criteria may include receiving the request to cease mitigating actions via a preregistered device that was registered with the system for at least a predetermined amount of time (e.g., at least 6 months, at least one year, or the like). In another example, authentication data may be required from multiple authorized users and must match pre-stored authentication data for those users to meet high trust criteria. Various other high trust criteria may be used without departing from the invention.

At step 237, based on the evaluation at step 236, a notification and/or instruction may be generated. For instance, if high trust criteria are met, a notification indicating that mitigating actions will cease and an instruction causing mitigating actions to cease may be generated and transmitted to one or more computing devices, systems, or the like (e.g., internal systems, external systems, and the like). If high trust criteria are not met, a notification indicating that high trust criteria were not met may be generated and transmitted to external entity computing system 160 and/or other devices.

At step 238, the generated notification and/or instruction may be transmitted to one or more other devices or systems, such as external entity computing system 160. Although not shown in FIG. 2H, the notification and/or instruction may be transmitted to other devices or systems and, in some examples, may be transmitted to each device or system to which mitigating action instructions were transmitted.

At step 239, the notification and/or instruction may be received an executed by the external entity computing system 160.

Figure 3:
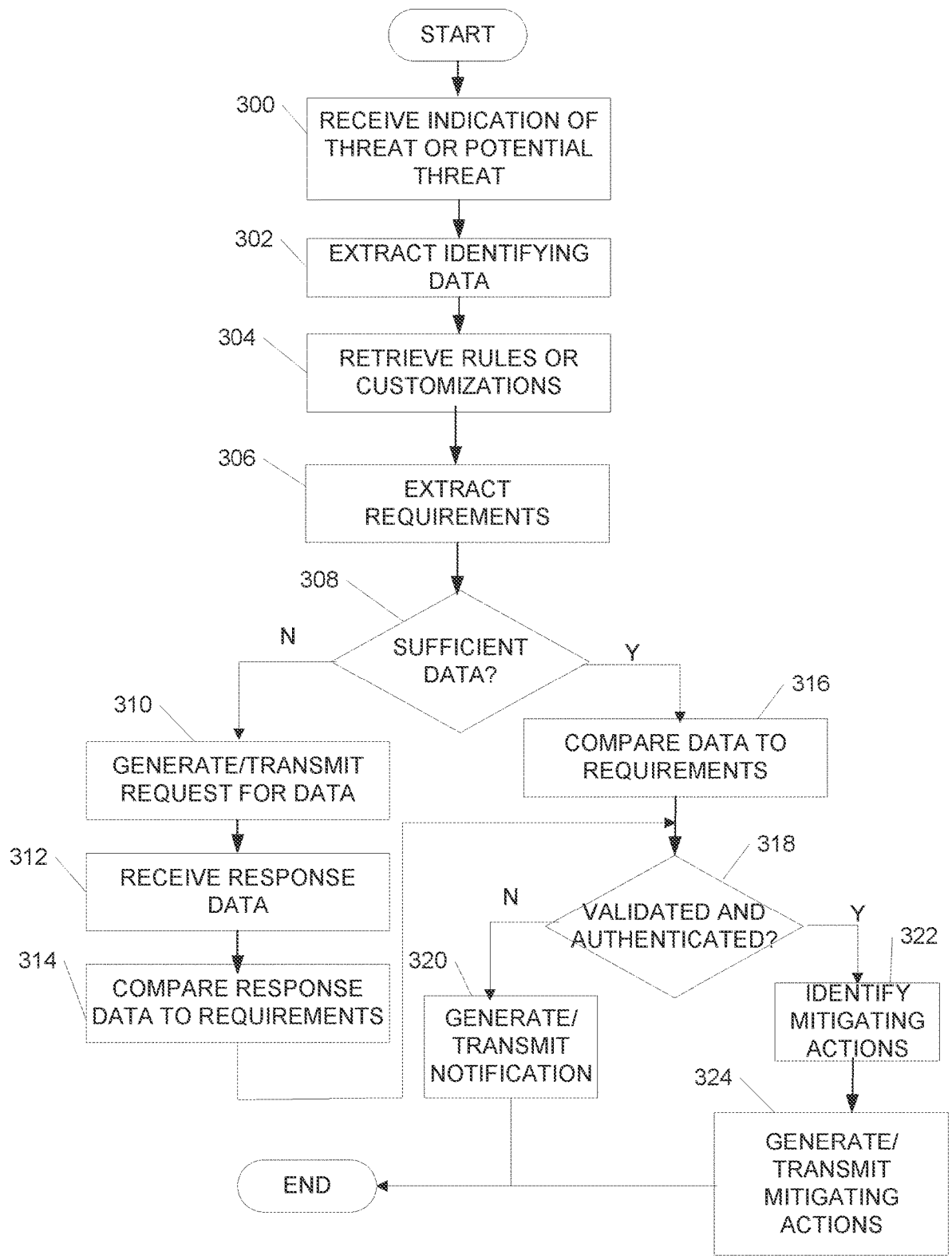
FIG. 3 illustrates an illustrative method for implementing comprehensive threat mitigation functions according to one or more aspects described herein.

FIG. 3 is a flow chart illustrating one example method of implementing comprehensive threat mitigating functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, an indication of a cybersecurity threat or potential threat may be received by comprehensive threat mitigation computing platform 110. In some examples, the indication of threat or potential threat may be received from an external entity computing system associated with an external entity.

At step 302, data may be extracted from the indication of threat or potential threat. For instance, information identifying the external entity may be extracted and used to identify data related to the external entity.

At step 304, based on the extracted data identifying the external entity, one or more rules or customizations associated with the external entity may be retrieved. For instance, during a registration process, one or more rules or customizations may be selected or identified by the external entity and stored. Those rules or customizations may then be retrieved upon receiving a an indication of threat or potential threat.

At step 306, one or more requirements for authentication and/or validation may be extracted from the retrieved rules or customizations. For instance, requirements associated with names, categories or groups of users that may provide the indication of threat or potential threat or may request comprehensive threat mitigating actions may be extracted. In another example, device identifier(s) associated with one or more devices of the external entity computing system from which valid indications of threats or potential threats may be received may be extracted.

At step 308, a determination may be made as to whether data received with the indication of threat or potential threat is sufficient to meet requirements associated with the rules and customizations of the external entity.

If not, at step 310, a request for authentication and/or validation data may be generated and transmitted to the external entity computing system from which the indication was received. In response to the request, validation or authentication response data may be received from the external entity computing system 160 at step 312. At step 314, the received authentication or validation response data may be compared to the requirements extracted from the rules or customizations.

If, at step 308, there is sufficient data, at step 316, the data received with the indication of threat or potential threat may be compared to the requirements extracted from the rules of customizations.

At step 318, based on the comparing of the authentication or validation response data to the requirements, or the data received with the indication of threat or potential threat to the requirements, a determination may be made as to whether the indication of threat or potential threat is validated and authenticated. If not, at step 320, a notification may be generated indicating that the indication was not validated or authenticated and the notification may be transmitted to the external entity computing system 160.

If, at step 318, it is determined that the indication of threat or potential threat is validated and authenticated, at step 322, one or more mitigating actions may be identified. For instance, mitigating actions customized by the external entity may be retrieved. Additionally or alternatively, one or more default mitigating actions may be identified.

At step 324, one or more instructions causing execution of the mitigating actions may be generated and transmitted to one or more computing devices, such as internal entity computing devices or systems, external entity computing devices, or the like.

Aspects described herein after directed to efficiently executing mitigating actions at multiple entities based on a single indication of a threat or potential threat. For instance, if an external entity detects a threat or potential threat, a notification may be transmitted to an enterprise organization, such as a financial institution, who will then execute one or more mitigating actions to protect the external entity, the enterprise organization and/or one or more other entities. Accordingly, key partners can quickly and securely be informed of a threat or potential threat and mitigating actions may be executed. In some examples, the mitigating actions may be executed in advance of or at the beginning of an investigation of assessment of risk associated with the threat or potential threat being performed by the external entity and/or the enterprise organization.

In some examples, one or more mitigating actions may include moving the external entity to a predefined backup plan (e.g., executing one or more mitigating actions to move computer processing to alternate servers, communicating via alternate secure channels, and the like). Further, in some instances, services may be disrupted to avoid potential harm to the entity or service. Accordingly, by transmitting the indication of threat or potential threat, the comprehensive threat mitigation computing platform 110 may execute actions that may transition the external entity or external entity computing system(s) operating in a first state to a second state that may aim to mitigate harm caused by the threat or potential threat.

Further, in some examples, the enterprise organization may leverage threat data received to execute one or more mitigating actions associated with other external entities. For instance, other entities at risk may be notified of the threat or potential threat, other accounts or entities that may be impacted by one or more mitigating actions (e.g., account freeze, transaction suspension, or the like) may be notified, and the like. In some examples, a watch list may be generated to monitor one or more accounts or other external entities for signs of unauthorized activity based on the detected threat or potential threat at the external entity.

Aspects described herein are related to authenticating and validating the indication of the threat or potential threat. For instance, a verification module may be associated with the software executing one or more functions described herein at the enterprise organization. The verification module may be definable or customizable by the external entity and/or scalable. The verification module may be encompassed by the validation and authentication aspects described herein.

As discussed herein, one or more users from one or more external entities may transmit the indication of threat or potential threat. In some examples, the indication may be input into an application executing on the external entity computing system 160 and in communication with the enterprise organization, comprehensive threat mitigation computing platform 110, and the like. For instance, the comprehensive threat mitigation computing platform 110 may be configured to provide or communicate with a customer portal through which the external entity may register for the services and functions described herein, may customize mitigating actions, may input a request for comprehensive threat mitigation activities or input an indication of a threat or potential threat, or the like. In some examples, an external entity may generate a profile that may include one or more customizations, may include selections for when to execute actions, may turn on or off various options or aspects, or the like. In some examples, the profile may provide customers such as external entities to determine levels of response (e.g., freeze all accounts, freeze some accounts, or the like), may determine how the external entity should be notified (e.g., identification of alternate devices or communication channels, and the like). In some examples, the profile may include a plurality of selectable options for various mitigating actions, communication channels, types of actions to execute, or the like.

While aspects described herein are generally discussed in the context of external entities, such as corporate entities, or the like, aspects described herein may be applied to individual customers of the enterprise organization. For instance, a financial institution may provide comprehensive mitigating actions to individual customers via, for instance, an online or mobile banking application. A user may update their profile to include customization options and, if a threat or potential threat is detected, the user may provide an indication via the online or mobile banking application and the system may execute instructions or mitigating actions based on the user's profile.

As discussed herein, removal of mitigating actions may require a high trust authentication. For instance, if a request to remove mitigating actions is received from a device that was preregistered a week prior, that might not be considered high trust because of the relative recency of the updated device information. Alternatively, if the device was registered a year ago, that might be considered high trust due to the length of time for which the device was registered.

In some examples, communications may be transmitted to various other external entities. For instance, notifications or communications may be transmitted to entities such as security personnel, credit reporting agencies, other financial institutions, and the like, that may be identified by the external entity. For instance, with a request or permission of the external entity (e.g., based on a customization or rule), one or more notifications may be generated and transmitted to various other external entities. In some examples, these notifications may be generated and stored until a user reviews and determines that the notification should be transmitted.

As discussed herein, in some examples, alternate communication channels may be used in response to execution of mitigating actions. For instance, more secure communication channels may be used as alternate communication channels. For instance, phone calls may be generally sent via an open phone channel but, if alternate communications are executed, a secure or encrypted phone line may be used. Further, in some examples, notifications may be transmitted to one or more other entities identifying the expected alternate communication channel (e.g., a phone number from which to expect calls, or the like).

Accordingly, as discussed herein, a cybersecurity threat detected at an entity may be communicated via a single indication or request for comprehensive mitigating actions to multiple entities (e.g., enterprise organization, systems internal to the enterprise organization, other external entities, external entity systems, and the like). That is, a single communication to the comprehensive threat mitigation computing platform 110 may cause communication to various other entities, thereby ensuring a rapid response to any threats.

Figure 5:
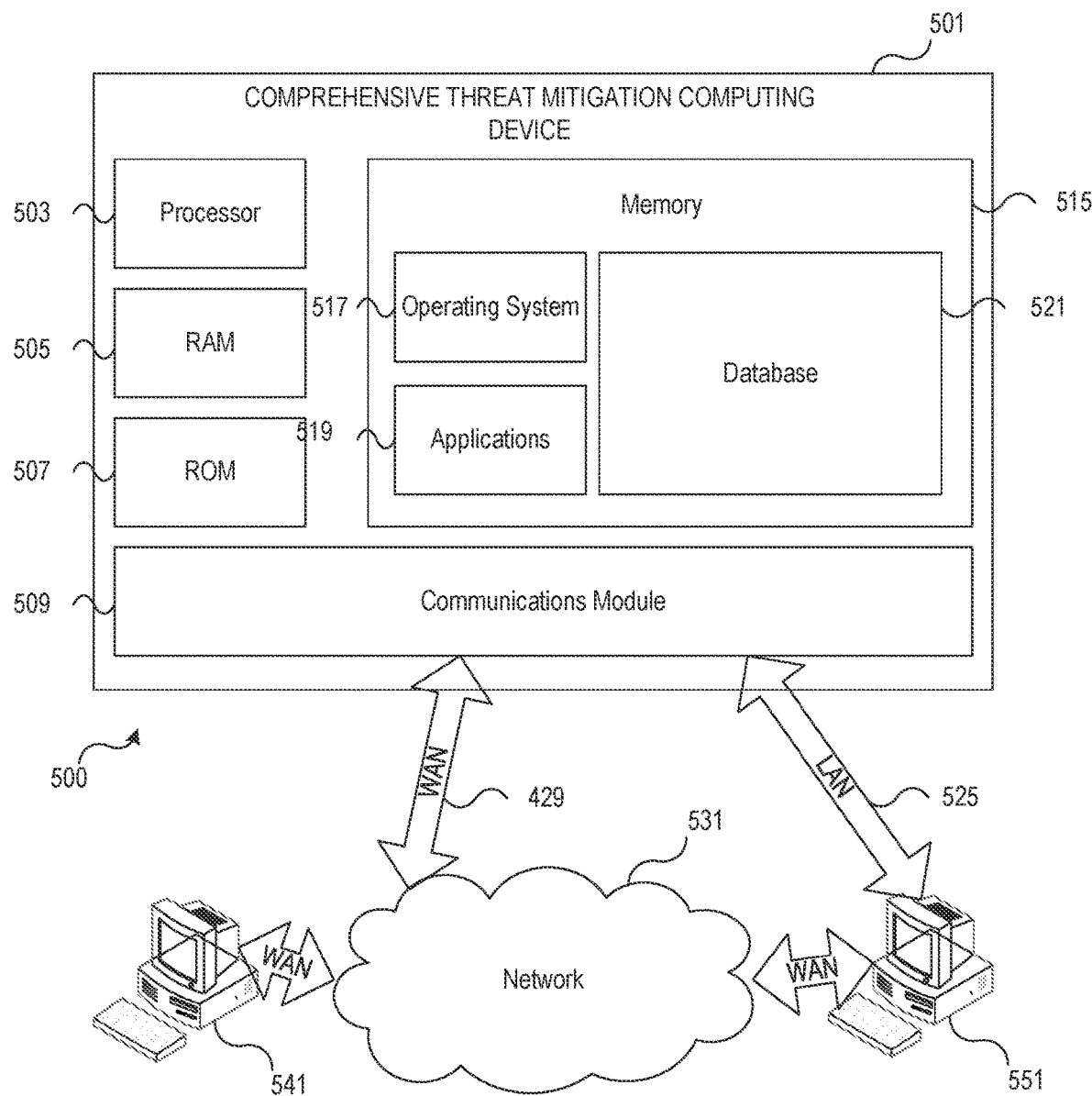
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include comprehensive threat mitigation computing device 501 having processor 503 for controlling overall operation of comprehensive threat mitigation computing device 501 and its associated components, including Random Access Memory (RAM) 505, Read-Only Memory (ROM) 507, communications module 509, and memory 515. Comprehensive threat mitigation computing device 501 may include a variety of computer readable media. Computer readable media may be any available media that may be accessed by comprehensive threat mitigation computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by comprehensive threat mitigation computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on comprehensive threat mitigation computing device 501. Such a processor may execute computer-executable instructions stored on a computer-readable medium.

Software may be stored within memory 515 and/or storage to provide instructions to processor 503 for enabling comprehensive threat mitigation computing device 501 to perform various functions as discussed herein. For example, memory 515 may store software used by comprehensive threat mitigation computing device 5401, such as operating system 517, application programs 519, and associated database 521. Also, some or all of the computer executable instructions for comprehensive threat mitigation computing device 501 may be embodied in hardware or firmware. Although not shown, RAM 505 may include one or more applications representing the application data stored in RAM 505 while comprehensive threat mitigation computing device 501 is on and corresponding software applications (e.g., software tasks) are running on comprehensive threat mitigation computing device 501.

Communications module 509 may include a microphone, keypad, touch screen, and/or stylus through which a user of comprehensive threat mitigation computing device 501 may provide input, and may also include one or more of a speaker for providing audio output and a video display device for providing textual, audiovisual and/or graphical output. Computing system environment 500 may also include optical scanners (not shown).

Comprehensive threat mitigation computing device 501 may operate in a networked environment supporting connections to one or more remote computing devices, such as computing devices 541 and 551. Computing devices 541 and 551 may be personal computing devices or servers that include any or all of the elements described above relative to comprehensive threat mitigation computing device 501.

The network connections depicted in FIG. 5 may include Local Area Network (LAN) 525 and Wide Area Network (WAN) 529, as well as other networks. When used in a LAN networking environment, comprehensive threat mitigation computing device 501 may be connected to LAN 525 through a network interface or adapter in communications module 509. When used in a WAN networking environment, comprehensive threat mitigation computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
a memory storing computer-readable instructions that, when executed by the at least one processor, cause the computing platform to:
receive, via a secure communication channel, an indication of a threat or potential threat from a first external entity computing system;
extract, from the indication of the threat or potential threat, an identity of a first external entity associated with the first external entity computing system;
retrieve, based on the identity of the first external entity, one or more rules or customizations associated with the first external entity;
extract, from the one or more rules or customizations, requirements for authentication and validation of the indication of the threat or potential threat;
compare information received with the indication of the threat or potential threat with the one or more rules or customizations to determine whether sufficient information is included in the information received with the indication of the threat or potential threat;
responsive to determining that sufficient information is not included:
generate a request for authentication or validation data;
transmit, via the secure communication channel, the request for authentication or validation data to the first external entity computing system;
receive, via the secure communication channel and from the external entity computing system, authentication or validation response data; and
compare the authentication or validation response data to the requirements extracted from the one or more rules or customizations to determine whether the indication of the threat or potential threat is authenticated and validated;
responsive to determining that sufficient information is included, compare the information received with the indication of the threat or potential threat to the requirements extracted from the one or more rules or customizations to determine whether the indication of the threat or potential threat is authenticated and validated;
responsive to determining, based on one of: the comparing the authentication and validation response data to the one or more rules or customizations, or the information received with the indication of the threat or potential threat to the one or more rules or customizations, that the threat or potential threat is not validated and authenticated:
generate a first notification indicating that the threat or potential threat is not validated and authenticated; and
transmit, via the secure communication channel, the first notification indicating that the threat or potential threat is not validated or authenticated to the first external entity computing system;
responsive to determining based on one of: the comparing the authentication and validation response data to the one or more rules or customizations, or the information received with the indication of threat or potential threat to the one or more rules or customizations, that the threat or potential threat is validated and authenticated:
identifying one or more mitigating actions;
generate instructions causing execution of the one or more mitigating actions; and
transmit, via the secure communication channel, the generated instructions to one or more devices for execution.

2. The computing platform of claim 1, wherein the one or more mitigating actions include initiating communications via an alternate communication channel.

3. The computing platform of claim 1, wherein the one or more mitigating actions include suspending transactions associated with one or more accounts of the first external entity and freezing the one or more accounts of the external entity.

4. The computing platform of claim 1, wherein the one or more rules or customizations are specific to the first external entity and are received during a registration process.

5. The computing platform of claim 4, wherein the one or more rules or customizations include validating that the indication of a threat or potential threat is received from a pre-registered device identified during the registration process.

6. The computing platform of claim 1, further including instructions that, when executed, cause the computing platform to:
responsive to determining based on one of: the comparing the authentication and validation response data to the one or more rules or customizations, or the information received with the indication of the threat or potential threat to the one or more rules or customizations, that the threat or potential threat is validated and authenticated, generate a second notification informing a second external entity, different from the first external entity, of the threat or potential threat.

7. The computing platform of claim 6, further including instructions that, when executed, cause the computing platform to transmit the second notification to an external entity computing system of the second external entity.

8. A method, comprising:
receiving, by a computing platform and via a secure communication channel, the computing platform having at least one processor and memory, an indication of a threat or potential threat from a first external entity computing system;
extracting, by the at least one processor and from the indication of the threat or potential threat, an identity of a first external entity associated with the first external entity computing system;

retrieving, by the at least one processor and based on the identity of the first external entity, one or more rules or customizations associated with the first external entity;
extracting, by the at least one processor and from the one or more rules or customizations, requirements for authentication and validation of the indication of the threat or potential threat;
comparing, by the at least one processor, information received with the indication of threat or potential threat with the one or more rules or customizations to determine whether sufficient information is included in the information received with the indication of the threat or potential threat;
when it is determined that sufficient information is not included:
 generating, by the at least one processor, a request for authentication or validation data;
 transmitting, by the at least one processor and via the secure communication channel, the request for authentication or validation data to the first external entity computing system;
 receiving, by the at least one processor and from the first external entity computing system and via the secure communication channel, authentication or validation response data; and
 comparing, by the at least one processor, the authentication or validation response data to the requirements extracted from the one or more rules or customizations to determine whether the indication of the threat or potential threat is authenticated and validated;
when it is determined that sufficient information is included, comparing, by the at least one processor, the information received with the indication of the threat or potential threat to the requirements extracted from the one or more rules or customizations to determine whether the indication of the threat or potential threat is authenticated and validated;
when it is determined, based on one of: the comparing the authentication and validation response data to the one or more rules or customizations, or the information received with the indication of the threat or potential threat to the one or more rules or customizations, that the threat or potential threat is not validated and authenticated:
 generating, by the at least one processor, a first notification indicating that the threat or potential threat is not validated and authenticated; and
 transmitting, by the at least one processor and via the secure communication channel, the first notification indicating that the threat or potential threat is not validated or authenticated to the first external entity computing system;
when it is determined based on one of: the comparing the authentication and validation response data to the one or more rules or customizations, or the information received with the indication of the threat or potential threat to the one or more rules or customizations, that the threat or potential threat is validated and authenticated:
 identifying, by the at least one processor, one or more mitigating actions;
 generating, by the at least one processor, instructions causing execution of the one or more mitigating actions; and
 transmitting, by the at least one processor and via the secure communication channel, the generated instructions to one or more devices for execution.

9. The method of claim 8, wherein the one or more mitigating actions include initiating communications via an alternate communication channel.

10. The method of claim 8, wherein the one or more mitigating actions include suspending transactions associated with one or more accounts of the first external entity and freezing the one or more accounts of the first external entity.

11. The method of claim 8, wherein the one or more rules or customizations are specific to the first external entity and are received during a registration process.

12. The method of claim 11, wherein the one or more rules or customizations include validating that the indication of the threat or potential threat is received from a pre-registered device identified during the registration process.

13. The method of claim 8, further including:
 when it is determined based on one of: the comparing the authentication and validation response data to the one or more rules or customizations, or the information received with the indication of the threat or potential threat to the one or more rules or customizations, that the threat or potential threat is validated and authenticated, generating, by the at least one processor, a second notification informing a second external entity, different from the first external entity, of the threat or potential threat.

14. The method of claim 13, further including transmitting, by the at least one processor, the second notification to an external entity computing system of the second external entity.

15. One or more non-transitory computer-readable media storing instructions that, when executed by a computing platform comprising at least one processor, memory, and a communication interface, cause the computing platform to:
 receive, via a secure communication channel, an indication of a threat or potential threat from a first external entity computing system;
 extract, from the indication of the threat or potential threat, an identity of a first external entity associated with the first external entity computing system;
 retrieve, based on the identity of the first external entity, one or more rules or customizations associated with the first external entity;
 extract, from the one or more rules or customizations, requirements for authentication and validation of the indication of the threat or potential threat;
 compare information received with the indication of the threat or potential threat with the one or more rules or customizations to determine whether sufficient information is included in the information received with the indication of the threat or potential threat;
 responsive to determining that sufficient information is not included:
  generate a request for authentication or validation data;
  transmit, via the secure communication channel, the request for authentication or validation data to the first external entity computing system;
  receive, from the external entity computing system and via the secure communication channel, authentication or validation response data; and
  compare the authentication or validation response data to the requirements extracted from the one or more rules or customizations to determine whether the indication of the threat or potential threat is authenticated and validated;

responsive to determining that sufficient information is included, compare the information received with the indication of the threat or potential threat to the requirements extracted from the one or more rules or customizations to determine whether the indication of the threat or potential threat is authenticated and validated;

responsive to determining, based on one of: the comparing the authentication and validation response data to the one or more rules or customizations, or the information received with the indication of the threat or potential threat to the one or more rules or customizations, that the threat or potential threat is not validated and authenticated:
  generate a first notification indicating that the threat or potential threat is not validated and authenticated; and
  transmit, via the secure communication channel, the first notification indicating that the threat or potential threat is not validated or authenticated to the first external entity computing system;

responsive to determining based on one of: the comparing the authentication and validation response data to the one or more rules or customizations, or the information received with the indication of the threat or potential threat to the one or more rules or customizations, that the threat or potential threat is validated and authenticated:
  identify one or more mitigating actions;
  generate instructions causing execution of the one or more mitigating actions; and
  transmit, via the secure communication channel, the generated instructions to one or more devices for execution.

16. The one or more non-transitory computer-readable media of claim 15, wherein the one or more mitigating actions include initiating communications via an alternate communication channel.

17. The one or more non-transitory computer-readable media of claim 15, wherein the one or more mitigating actions include suspending transactions associated with one or more accounts of the first external entity and freezing the one or more accounts of the external entity.

18. The one or more non-transitory computer-readable media of claim 15, wherein the one or more rules or customizations are specific to the first external entity and are received during a registration process.

19. The one or more non-transitory computer-readable media of claim 18, wherein the one or more rules or customizations include validating that the indication of the threat or potential threat is received from a pre-registered device identified during the registration process.

20. The one or more non-transitory computer-readable media of claim 15, further including instructions that, when executed, cause the computing platform to:
  responsive to determining based on one of: the comparing the authentication and validation response data to the one or more rules or customizations, or the information received with the indication of the threat or potential threat to the one or more rules or customizations, that the threat or potential threat is validated and authenticated, generate a second notification informing a second external entity, different from the first external entity, of the threat or potential threat.

21. The one or more non-transitory computer-readable media of claim 20, further including instructions that, when executed, cause the computing platform to transmit the second notification to an external entity computing system of the second external entity.

* * * * *